INVENTORS
WILLIAM P. MOORE
ROB R. MacGREGOR
BY
ATTORNEY

3,087,970
SYNTHESIS OF PROPARGYL ALCOHOL FROM FORMALDEHYDE AND ACETYLENE

William P. Moore, Chesterfield County, and Rob R. MacGregor, Hopewell, Va., assignors to Allied Chemical Corporation, New York, N.Y., a corporation of New York
Filed Oct. 19, 1959, Ser. No. 847,223
3 Claims. (Cl. 260—638)

This invention relates to an improved process for the synthesis of propargyl alcohol from formaldehyde and acetylene. More particularly it relates to a process wherein the reaction is carried out in the liquid phase.

Numerous processes have been developed wherein alkanols are prepared by reacting aldehydes or ketones with acetylene hydrocarbons in the presence of catalysts and solvents or diluents for the otherwise gaseous acetylene. It has furthermore been suggested that acetylene can be absorbed from other gases containing the same with the aid of an N-alkyl-2-pyrrolidone in which the acetylene is readily dissolved.

In accordance with this invention it has now been found that a markedly high production rate of propargyl alcohol and favorable propargyl alcohol to butynediol ratio can be attained at relatively low operating pressures when a closely defined aqueous N-alkyl-2-pyrrolidone solvent is used in the synthesis of propargyl alcohol from formaldehyde and acetylene while employing a fixed bed or a slurried catalyst.

In the drawing, FIG. 1 is a diagrammatic flow diagram showing a preferred process for the preparation of propargyl alcohol in accordance with the invention.

Typical reactions in the production of propargyl alcohol are shown by the following equations:

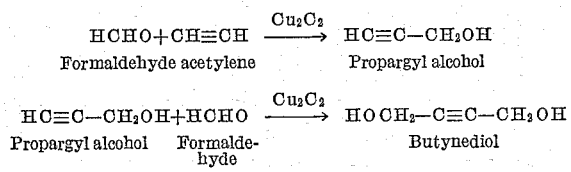

The solvent which has been found suitable for use in accordance with this invention is one of the N-alkyl-pyrrolidone compounds in which the alkyl substituent is a straight or branched chain containing 1 to 8 carbon atoms in the alkyl radical. These compounds are unusually good absorbents and have unusually high solubility coefficients for acetylene as compared with other compounds which may also be used for this purpose. In addition to their high absorption coefficients for acetylene gases, these compounds have other properties which are particularly fitted for this purpose. They have low vapor pressures and high boiling points and, consequently, are quite stable at the temperatures at which this reaction is carried out.

The reaction for the formation of propargyl alcohol is usually carried out in the presence of catalysts which may be any one of the heavy metals of the first and second groups of the periodic system and their compounds, especially the acetylene compounds—in particular copper and its compounds—cuprous acetylide being one of the preferred compounds which is preferably used in the form of a slurry. The reaction may be carried out in the presence of the acetylene compounds of these heavy metals which have been previously prepared. It is also possible to allow these acetylene compounds to be formed in the course of the reaction itself. This method of preparing and using these catalysts is well known in the prior art and is described in U.S.P. 2,232,867, of Feb. 25, 1941 to Reppe and Keyssner.

For purposes of illustration only the mechanics of the process of this invention will be described in detail with reference to the use of N-methyl-2-pyrrolidone as the solvent and slurried cuprous acetylide as the catalyst.

Figure 1:
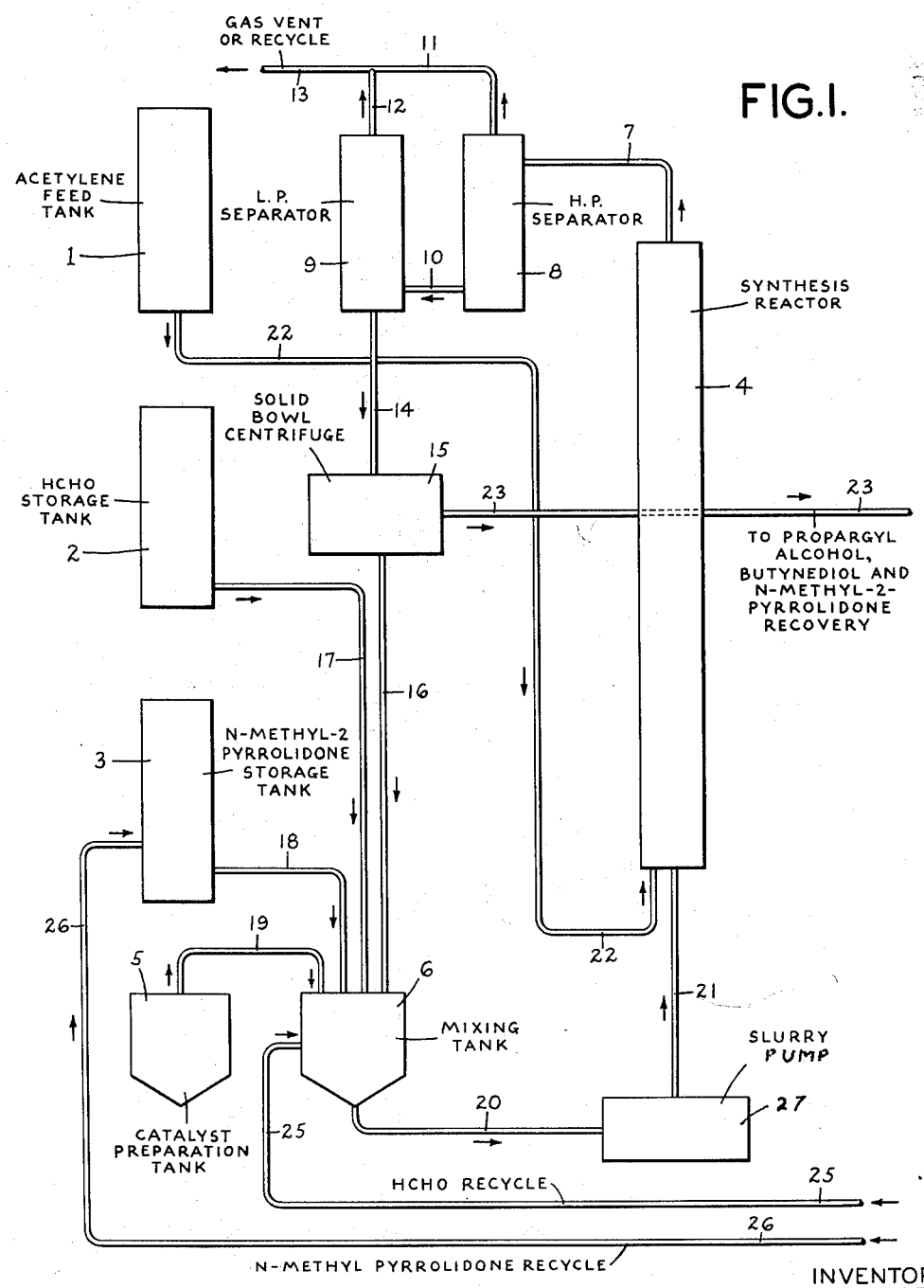

A process for synthesis of propargyl alcohol employing the aqueous-N-methyl-2-pyrrolidone solvent is diagrammatically illustrated in FIG. 1. In accordance therewith aqueous formaldehyde is pumped from storage tank 2 through line 17 to mixing tank 6 where it is agitated with catalyst solids obtained from centrifuge 15, via line 16, recycled N-methyl-2-pyrrolidone from storage tank 3, via line 18 and recycled formaldehyde 25 to give a reaction mixture containing about 16% (wt.) water. From the mixing tank 6 via line 20, the catalyst-feed mixture is pumped by slurry pump 27 through line 21 into the bottom of the synthesis reactor 4. Acetylene gas enters the bottom of the reactor through line 22 from acetylene feed tank 1. Part of the acetylene goes into solution and reacts with formaldehyde to produce propargyl alcohol and butynediol while the remainder bubbles through the reaction mixture to keep the catalyst evenly suspended. The heat of reaction is removed by internal or external heat exchange or by evaporative cooling. The liquid product and unreacted gas leave the reactor at the top through line 7 and enter high-pressure separator 8 where gas is disengaged from the catalyst-liquid product stream. The product slurry is drained through line 10 to a low-pressure separator 9 where dissolved acetylene is flashed off through line 12. The released gas goes to a recycle pump or a vent along with the gas from high-pressure separator 8 through line 13. The slurry product from the low-pressure receiver 9 goes through line 14 to centrifuge 15 which removes the catalyst from the liquid product. The catalyst drops from the centrifuge through chute 16 to the feed mixing tank 6.

The clear liquid product from the centrifuge passes through line 23 to the purification system where pure propargyl alcohol and butynediol products are recovered by distillation while N-methyl-2-pyrrolidone and unreacted formaldehyde are recovered for recycle.

The following example illustrates the preferred process for the synthesis of propargyl alcohol employing the innovations herein described:

EXAMPLE 1a

A liquid feed of the following composition was continuously fed to the synthesis reactor:

Wt. of stream _____ lbs__ 99.54

| Component: | Wt. percent |
|---|---|
| Formaldehyde | 11.6 |
| Propargyl alcohol | 0.8 |
| Butynediol | 2.0 |
| Water | 17.8 |
| N-methyl pyrrolidone | 62.9 |
| Catalyst (20% Cu$_2$C$_2$ on silica) | 4.9 |
| Cuprene | 0.01 |

Acetylene gas was fed to the bottom of the reactor concurrently with the liquid feed. The synthesis reactor was operated at 135° C., 150 p.s.i.g. pressure, liquid space velocity—1.59 per hr., HCHO/C$_2$H$_2$ feed ratio—1.235 mols/mol, with formaldehyde and acetylene conversions per pass of 50.9% and 61.7%, respectively. The weight ratio of propargyl alcohol to butynediol produced was 2.95. Propargyl alcohol and butynediol space time yields were 115.5 and 39.2 grams/(liter)(hr.), respectively. The mixture leaving the top of the reactor containing the slurried catalyst and entrained gases, weighing 107.3 lbs. had the following composition:

| Component: | Wt. percent |
|---|---|
| Formaldehyde | 5.28 |
| Propargyl alcohol | 7.74 |
| Butynediol | 4.36 |
| Water | 16.5 |
| N-methyl-2-pyrrolidone | 58.3 |
| Catalyst | 4.5 |
| Cuprene | 0.13 |
| Acetylene | 2.77 |
| Inerts | 0.36 |

This mixture entered the high-pressure separator where inert gases and part of the unreacted acetylene were disengaged. The product slurry drained from the high-pressure receiver to the low-pressure receiver weighed 106.10 lbs. and had the following composition:

| Component: | Wt. percent |
|---|---|
| Formaldehyde | 5.34 |
| Propargyl alcohol | 7.82 |
| Butynediol | 4.41 |
| N-methyl-2-pyrrolidone | 59.0 |
| Water | 16.7 |
| Cuprene | 0.13 |
| Catalyst | 4.6 |
| Acetylene | 1.7 |
| Inerts (gas) | 0.33 |

The desorbed gas from the low-pressure receiver went to a recycle pump or a vent along with the gas from the high-pressure receiver. The slurry product from the low-pressure receiver weighed 103.73 lbs. and had the following composition:

| Component: | Wt. percent |
|---|---|
| Formaldehyde | 5.43 |
| Propargyl alcohol | 7.97 |
| Butynediol | 4.51 |
| N-methyl-2-pyrrolidone | 60.3 |
| Water | 16.9 |
| Catalyst | 4.67 |
| Cuprene | 0.13 |

The slurry above was sent to a solid bowl centrifuge which removed the catalyst and dropped it through a chute to the feed tank for re-use. The catalyst-recycle stream weighed 13.92 lbs. and had the following composition:

| Component: | Wt. percent |
|---|---|
| Catalyst | 34.85 |
| Formaldehyde | 2.87 |
| Propargyl alcohol | 2.51 |
| Butynediol | 14.44 |
| N-methyl-2-pyrrolidone | 29.5 |
| Cuprene | 0.07 |
| Water | 15.8 |

The clear centrifugate weighed 89.91 lbs. and had the following composition:

| Component: | Wt. percent |
|---|---|
| Propargyl alcohol | 8.82 |
| Butynediol | 2.97 |
| Formaldehyde | 5.82 |
| Water | 17.1 |
| N-methyl-2-pyrrolidone | 65.1 |
| Cuprene | 0.14 |

The centrifugate was sent to the purification system where propargyl alcohol in 99.5% purity was recovered by distillation operations. Butynediol was also recovered. The N-methyl-2-pyrrolidone and unreacted formaldehyde were recovered and recycled to the synthesis reactor.

In the preparation of propargyl alcohol with the use of N-methyl-2-pyrrolidone as the solvent and cuprous acetylide as the catalyst, and effective range of operating conditions for the efficient synthesis of propargyl alcohol was found to be as follows:

| Feed composition: | Wt. percent |
|---|---|
| N-methyl-2-pyrrolidone | 50–80 |
| Water (preferably 14–20) | 8–36 |
| Formaldehyde | 8–20 |

| | |
|---|---|
| Reaction Temperature, °C | 90–150. |
| Reaction pressure, p.s.i.g | 100–200. |
| Reaction time, hrs | 0.2–5.0. |
| Catalyst carrier (about 300 mesh) | Silica or carbon. |
| Catalyst conc. in slurry, wt. percent | 3–10. |
| Cuprous acetylide on carrier wt. percent | 15–30. |
| Ratio $HCHO/C_2H_2$ feed, mols/mol | 1–1.5. |

While the range given above for water is considered to be critical, the other ranges given are merely preferred ranges found to be effective for most efficient operation. Aqueous N-methyl-2-pyrrolidone was found to be a most effective and practical medium for carrying out the synthesis of propargyl alcohol by reaction of formaldehyde and acetylene. Unexpectedly, the concentration of water in the reaction mixture must be held within a narrow range to obtain maximum propargyl alcohol production rate.

Figure 2:
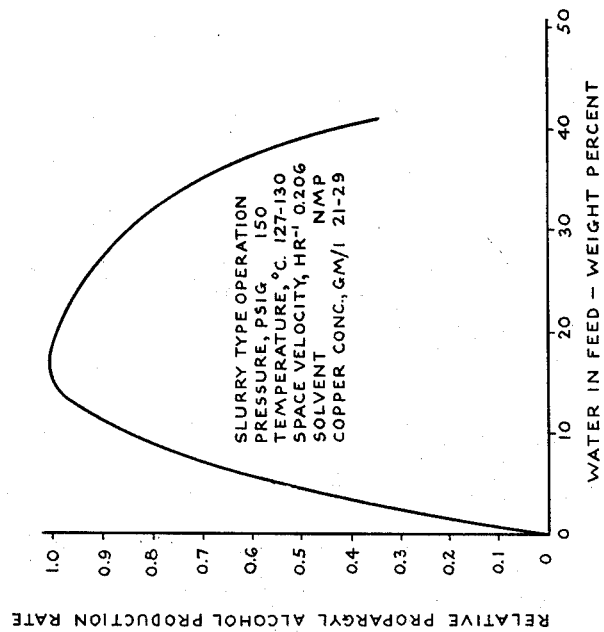
FIG. 2 is a curve showing the effect of the percentage of water in the feed on relative propargyl alcohol production rate.

It has been further found that high propargyl alcohol production rates and satisfactory propargyl alcohol butynediol production ratios can be obtained only when the water concentration in the N-methyl-2-pyrrolidone formaldehyde feed mixture is held near the optimum of 14–20% (wt.). As shown in FIG. 2, a 25% reduction in the propargyl alcohol production rate results when the water concentration in the feed is reduced from the optimum 16% (wt.) to about 8% or increased to 36%.

Figure 3:
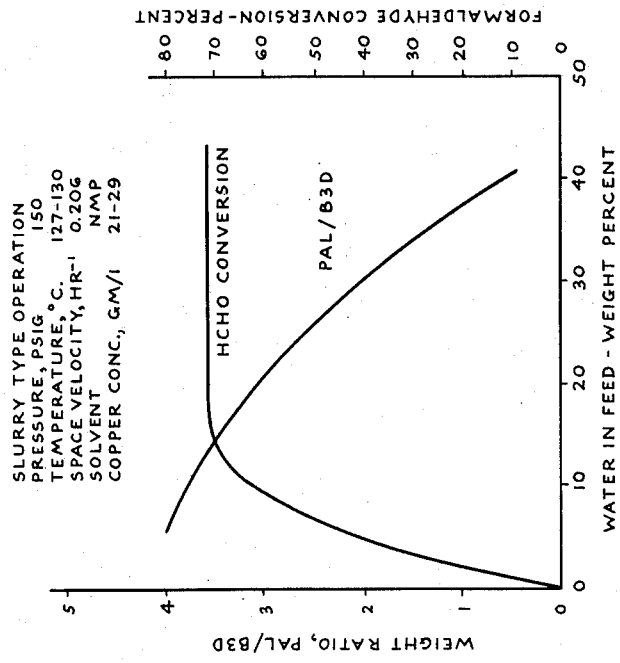
FIG. 3 depicts curves showing the effect of the amount of water in the aqueous solvent feed on the propargyl alcohol to butynediol weight ratio formed and the formaldehyde conversion.

As shown in FIG. 3, wherein the operating conditions are set forth, reducing the concentration of water in the feed from 16% (wt.) to 8% results in about a 30% decline in the percent formaldehyde attack, i.e., from 71% to 55% and a small favorable increase in the propargyl alcohol/butynediol production ratio, i.e., from 3.6 to 3.9 gms./gm. Conversely increasing the water concentration in the feed from 16% (wt.) to 36% results in a decline in the propargyl alcohol/butynediol production ratio from 3.6 to 1.25 gms./gm. without significant benefit in the formaldehyde conversion.

The outstanding performance of aqueous N-methyl-2-pyrrolidone as a solvent in the synthesis of propargyl alcohol can readily be observed from the following table giving typical data obtained when using various well-known solvents for acetylene:

*Typical Performance Data of Various Acetylene Solvents in Synthesis of Propargyl Alcohol Employing Fixed Catalyst Bed*

| Solvent (aqueous) | Wt. Ratio, PAL/B3D [1] | Relative Propargyl Alcohol Production Rate | Chemical Stability |
|---|---|---|---|
| N-methyl-2-pyrrolidone | 3.43 | 1.0 | Stable. |
| Dimethyl formamide | 1.31 | 0.93 | Unstable. |
| Ethyl acetate-methanol | 0.89 | 0.44 | Do. |
| Tetrahydrofuran | 0.89 | 0.64 | Stable. |
| Acetone | 0.64 | 0.99 | Do. |

[1] Wherever used in this specification PAL stands for propargyl alcohol and B3D stands for butynediol.

As can readily be seen, they were all found markedly less effective or impractical due to chemical instability as compared with the N-methyl-2-pyrrolidone-water medium of this invention. For example, aqueous solutions of acetone and tetrahydrofuran were chemically stable under the propargyl synthesis conditions but markedly less effective than N-methyl-2-pyrrolidone. Aqueous solutions of ethyl acetate and dimethylformamide were chemically unstable and less effective than the pyrrolidone solvent.

The following examples illustrate the importance of close control on the water content of the N-methyl-2-pyrrolidone reaction solvent by showing results obtained with water contents somewhat higher and lower than the preference range of 14–20%.

EXAMPLE 1b

When the reaction was conducted in the manner of Example 1a (preferred example) except that the water content of the feed was reduced to 5.4% (wt.), the formaldehyde and acetylene conversions were 27.3 and 30.0%, respectively. Propargyl alcohol and butynediol space-time yields were 17.2 and 4.1 grams/(liter)(hr.). Propargyl alcohol/butynediol ratio was 4.19 grams/gram.

EXAMPLE 2

With reaction conditions still held as in Example No. 1a except that water content was increased to 34% (wt.), total formaldehyde conversion was 71% and propargyl alcohol butynediol ratio was 1.5 grams/gram.

Any of the N-alkyl-2-pyrrolidones in which the alkyl group contains 1–8 carbon atoms in its radical or mixtures of them can be substituted for the N-methyl-2-pyrrolidones of the above examples and are effective to give the improved results as compared to those obtained when using previously proposed solvents.

Although certain preferred embodiments of the invention have been disclosed for purposes of illustration, it will be evident that various changes and modifications may be made therein without departing from the scope and spirit of the invention.

We claim:

1. In the process of reacting acetylene with formaldehyde in the presence of catalysts selected from the group consisting of heavy metals of the first and second groups of the periodic system and their compounds wherein propargyl alcohol and butynediol are formed that improvement for the preferential synthesis of propargyl alcohol of carrying out said reaction in the presence of aqueous N-alkyl-2-pyrrolidone in which the alkyl group contains 1–8 carbon atoms in its radical and in which the water concentration is held between 8–36 percent of the aqueous N-alkyl-2-pyrrolidone/formaldehyde feed mixture.

2. The improvement as defined in claim 1 wherein the N-alkyl-2-pyrrolidone is N-methyl-2-pyrrolidone.

3. The improvement as defined in claim 2 wherein the water concentration is 14 to 20 percent by weight, and cuprous acetylide is employed as catalyst for the reaction.

References Cited in the file of this patent

UNITED STATES PATENTS

| | | |
|---|---|---|
| 2,232,867 | Reppe et al. | Feb. 25, 1941 |
| 2,820,059 | Hasek et al. | Jan. 14, 1958 |
| 2,853,485 | Werner et al. | Sept. 23, 1958 |

FOREIGN PATENTS

| | | |
|---|---|---|
| 855,552 | Germany | Nov. 13, 1952 |
| 806,935 | Great Britain | Jan. 7, 1959 |